(12) United States Patent
Suissa et al.

(10) Patent No.: US 9,267,494 B2
(45) Date of Patent: Feb. 23, 2016

(54) SHAPE MEMORY ALLOY BASED LINEAR ACTUATOR ASSEMBLY

(71) Applicant: GM GLOBAL TECHNOLOGY OPERATIONS LLC, Detroit, MI (US)

(72) Inventors: Avshalom Suissa, Kiryat Ono (IL); Guy Raz, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 578 days.

(21) Appl. No.: 13/676,164

(22) Filed: Nov. 14, 2012

(65) Prior Publication Data

US 2014/0130492 A1 May 15, 2014

(51) Int. Cl.
*F01B 29/00* (2006.01)
*H01H 71/18* (2006.01)
*F03G 7/06* (2006.01)

(52) U.S. Cl.
CPC . *F03G 7/065* (2013.01); *F03G 7/06* (2013.01)

(58) Field of Classification Search
CPC ............ F03G 7/06; F03G 7/065; F16K 31/00
USPC .................................................... 60/527–529
See application file for complete search history.

(56) References Cited

U.S. PATENT DOCUMENTS

| | | | |
|---|---|---|---|
| 6,404,098 B1* | 6/2002 | Kayama et al. | 310/307 |
| 6,762,515 B2 | 7/2004 | Gummin et al. | |
| 6,832,477 B2 | 12/2004 | Gummin et al. | |
| 7,555,900 B1 | 7/2009 | Vallance et al. | |
| 7,723,896 B2* | 5/2010 | Esashi et al. | 310/306 |

OTHER PUBLICATIONS

Jose R. Santiago Anadon, "Large Force Shape Memory Alloy Linear Actuator", Thesis presented to University of Florida, 2002.

* cited by examiner

*Primary Examiner* — Thai Ba Trieu
*Assistant Examiner* — Deming Wan
(74) *Attorney, Agent, or Firm* — Quinn Law Group, PLLC

(57) ABSTRACT

A linear motion device includes a rod extending along a longitudinal axis, and a plurality of actuator units. Each of the plurality of actuator units includes at least one Shape Memory Alloy (SMA) element that is attached to a coupling mechanism. The at least one SMA element of each if the plurality of actuator units moves the coupling mechanism along the longitudinal axis, and into grasping engagement with the rod. Each actuator unit moves the rod a unit movement distance along the longitudinal axis in response to a control signal. The plurality of actuator units are actuated repeatedly in a cyclic order to move the rod in a continuous linear motion a distance greater than the unit movement distance of each of the plurality of actuator units.

17 Claims, 3 Drawing Sheets

SHAPE MEMORY ALLOY BASED LINEAR ACTUATOR ASSEMBLY

TECHNICAL FIELD

The invention generally relates to a linear actuator assembly for a linear motion device.

BACKGROUND

Many linear actuators exist for moving a rod along a linear path. Some linear actuators utilize a Shape Memory Alloy (SMA) element to linearly move the rod. The SMA element contracts in response to a control signal, such as an electric current to move the rod. When the electric current is interrupted, the SMA element cools, and returns, i.e., elongates to an initial, pre-contracted length. The length of the SMA element may decrease up to approximately 5% of the initial length of the SMA element during contraction. The actual decrease in length of the SMA element is dependent upon the heating temperature of the SMA element. Accordingly, the distance the SMA based linear actuators may move the rod is limited to approximately 5% of the length of the SMA element.

SUMMARY

A linear motion device is provided. The linear motion device includes a rod extending along a longitudinal axis, and a plurality of actuator units. Each of the plurality of actuator units includes at least one Shape Memory Alloy (SMA) element that is attached to a coupling mechanism. The at least one SMA element of each of the plurality of actuator units moves the coupling mechanism along the longitudinal axis and into grasping engagement with the rod. Each actuator unit moves the rod a unit movement distance along the longitudinal axis in response to a control signal. The plurality of actuator units are actuated repeatedly in a cyclic order to move the rod in a continuous linear motion a distance greater than the unit movement distance of each of the plurality of actuator units.

A linear actuator assembly for a linear motion device is also provided. The linear actuator assembly includes a plurality of actuator units. Each of the actuator units includes a housing, a coupling mechanism, and at least one Shape Memory Alloy (SMA) element attached to the coupling mechanism. The at least one SMA element moves the coupling mechanism from a neutral position, along a longitudinal axis, and into grasping engagement with a rod. The linear actuator assembly moves the rod a unit movement distance along the longitudinal axis in response to a control signal applied to the SMA element. The at least one SMA element of each of the plurality of actuator units contracts in response to the control signal to move the coupling mechanism. The at least one SMA element of each of the plurality of actuator units shortens in response to the cessation of the control signal, to release the coupling mechanism from the grasping engagement with the rod and allow the coupling mechanism to return to the neutral position. The plurality of actuator units are actuated repeatedly in a synchronized order to move the rod in a continuous linear motion a distance greater than the unit movement distance of each of the plurality of actuator units.

Accordingly, the linear actuator assembly uses a plurality of SMA based linear actuator units to move the rod in a continuous, smooth, un-interrupted motion. The movement of the rod is not limited to the individual unit movement distance of each of the individual SMA elements, because the plurality of actuator units are actuated repeatedly in the synchronous order. Accordingly, movement of the rod is limited only by the length of the rod.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
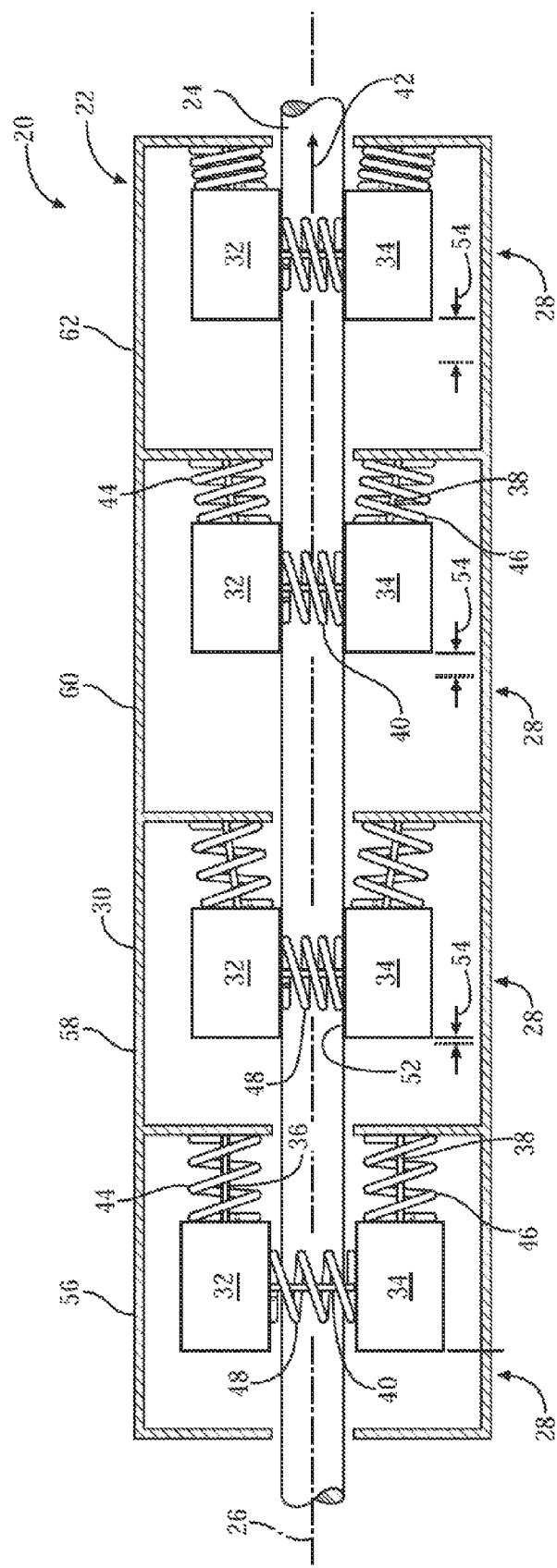
FIG. 1 is a schematic plan view of a linear motion device showing a linear actuator assembly having a plurality of actuator units.

Referring to the Figures, wherein like numerals indicate like parts throughout the several views, a linear motion device is generally shown at 20. Referring to FIG. 1, the linear motion device 20 includes a linear actuator assembly 22 that moves a rod 24 along a linear path defined by a longitudinal axis 26 of the rod 24.

The linear actuator assembly 22 includes a plurality of actuator units 28. Each of the actuator units 28 may include a housing 30, and at least one Shape Memory Alloy (SMA) element. Alternatively, the linear actuator assembly 22 may include a single housing 30 supporting the plurality of actuator units 28 therein. The SMA element is attached to a coupler, hereinafter referred to as a coupling mechanism, and connects the coupling mechanism to the housing 30. In response to a control signal, the SMA element of each if the actuator units 28 moves the coupling mechanism along the longitudinal axis 26, and into grasping engagement with the rod 24 to move the rod 24 along the longitudinal axis 26. The rod 24 and the coupling mechanism are both moveable relative to the housing 30.

As shown in FIG. 1, each of the actuator units 28 includes a first coupler, hereinafter referred to as a first coupling mechanism 32, and a second coupler, hereinafter referred to as a second coupling mechanism 34. However, it should be appreciated that the actuator units 28 may be configured to include only a single coupling mechanism. The first coupling mechanism 32 and the second coupling mechanism 34 are disposed on opposite sides of the rod 24. Additionally, each of the actuator units 28 shown in FIG. 1 includes a first SMA element 36 coupled to and interconnecting the first coupling mechanism 32 and the housing 30, a second SMA element 38 coupled to and interconnecting the second coupling mechanism 34 and the housing 30, and a connecting SMA element 40 extending between and attached to both the first coupling mechanism 32 and the second coupling mechanism 34. The first SMA element 36 and the second SMA element 38 contract in response to the control signal to move the first coupling mechanism 32 and the second coupling mechanism 34 in a first direction 42 parallel with the longitudinal axis 26. The connecting SMA element 40 contracts in response to the control signal to draw the first coupling mechanism 32 and the second coupling mechanism 34 together into grasping engagement with the rod 24.

Each of the actuator units 28 includes at least one spring, hereinafter referred to generically as a biasing device. The biasing device biases against the coupling mechanism to urge the coupling mechanism into the neutral position. As shown in FIG. 1, each of the actuator units 28 includes a first spring, hereinafter referred to as a first biasing device 44, coupled to and interconnecting the first coupling mechanism 32 and the housing 30, a second spring hereinafter referred to as a second biasing device 46, coupled to and interconnecting the second coupling mechanism 34 and the housing 30, and a connecting spring, hereinafter referred to as a connecting biasing device 48, extending between and attached to both the first coupling mechanism 32 and the second coupling mechanism 34. The first biasing device 44 and the second biasing device 46 bias the first coupling mechanism 32 and the second coupling mechanism 34 respectively against the housing 30 to move the first coupling mechanism 32 and the second coupling mechanism 34 in a second direction 50 parallel with the longitudinal axis 26, which is opposite the first direction 42. Accordingly, in response to the cessation or interruption of the control signal, and the resultant cooling and elongation of the first SMA element 36 and the second SMA element 38, the first biasing device 44 and the second biasing device 46 move the first coupling mechanism 32 and the second coupling mechanism 34 back into a neutral position as the first SMA element 36 and the second SMA element 38 elongate. The connecting biasing device 48 biases the first coupling mechanism 32 and the second coupling mechanism 34 against each other and away from each other. Accordingly, in response to the cessation or interruption of the control signal, and the cooling and elongation of the connecting SMA element 40, the connecting biasing device 48 moves the first coupling mechanism 32 and the second coupling mechanism 34 out of grasping engagement with the rod 24 and back into the neutral position.

At least one of the rod 24, the first coupling mechanism 32 and/or the second coupling mechanism 34 may include a friction feature 52. The friction feature 52 operates to increase friction between the rod 24 and at least one of the first coupling mechanism 32 and the second coupling mechanism 34. The friction feature 52 may include serrations, ridges, abrasive material, non-slip material, etc., formed into or attached to one of the rod 24, the first coupling mechanism 32, and/or the second coupling mechanism 34.

Actuation of the SMA element of each actuator unit 28 is capable of moving the rod 24 a unit movement distance 54. Accordingly, each individual actuator unit 28 is capable of moving the rod 24 a distance equal to the unit movement distance 54. The unit movement distance 54 of each actuator unit 28 may include a distance equal to approximately 5% of a total length of the SMA element of each actuator unit 28.

The SMA element moves the coupling mechanism in response to the control signal, such as but not limited to an electrical current applied to the SMA element. The control signal heats the SMA element, causing the SMA element to change forms and contract, as described in greater detail below. The SMA element of each of the actuator units 28 contracts in response to the control signal to move the coupling mechanism from the neutral position into grasping engagement with the rod 24, and to move the coupling mechanism along the longitudinal axis 26 to move the rod 24 the unit movement distance 54. The SMA element of each of the actuator units 28 elongates in response to the cessation of the control signal. Upon the cessation of the control signal, the SMA element cools, causing the SMA element to change forms and elongate or lengthen, as described in greater detail below. The elongation of the SMA element releases the coupling mechanism from the grasping engagement with the rod 24, and allows the coupling mechanism to return to a neutral position.

The plurality of actuator units 28 are actuated repeatedly in a synchronous and/or cyclic order to move the rod 24 in a continuous linear motion a distance that is greater than the unit movement distance 54 of each of the plurality of actuator units 28. As used herein, the term synchronous is defined as occurring at the same time, and the term cyclic is defined as recurring in cycles. Accordingly, it should be appreciated that the actuator units 28 operate simultaneously at the same time in a repeated cycle to move the rod 24. The cyclic order may occur, for example, when a control signal is applied to a first actuator unit 56, thereby causing the SMA element of the first actuator unit 56 to contract, which moves the coupling mechanism of the first actuator unit 56 into grasping engagement with the rod 24 and moves the rod 24 along the longitudinal axis 26. Prior to the first actuator unit 56 moving the complete unit movement distance 54, a control signal is applied to a second actuator unit 58, thereby causing the SMA element of the second actuator unit 58 to contract, which moves the coupling mechanism of the second actuator unit 58 into grasping engagement with the rod 24 and moves the rod 24 along the longitudinal axis 26. Once the second actuator unit 58 is disposed in grasping engagement with the rod 24 and is moving the rod 24 along the longitudinal axis 26, the control signal to the first actuator unit 56 is interrupted, thereby causing the coupling mechanism of the first actuator unit 56 to disengage the rod 24 and return to the neutral position of the first actuator unit 56.

Prior to the second actuator unit 58 moving the complete unit movement distance 54, a control signal is applied to a third actuator unit 60, thereby causing the SMA element of the third actuator unit 60 to contract, which moves the coupling mechanism of the third actuator unit 60 into grasping engagement with the rod 24 and moves the rod 24 along the longitudinal axis 26. Once the third actuator unit 60 is disposed in grasping engagement with the rod 24 and is moving the rod 24 along the longitudinal axis 26, the control signal to the second actuator unit 58 is interrupted, thereby causing the coupling mechanism of the second actuator unit 58 to disengage the rod 24 and return to the neutral position of the second actuator unit 58.

FIG. 1 further shows a fourth actuator unit 62 that operates in the same manner following the third actuator unit 60. Upon all of the actuator units 28 cycling through the synchronous and cyclic order described above, the cyclic order is repeated. In so doing, prior to the fourth actuator unit 62 moving the complete unit movement distance 54, a control signal is applied to the first actuator unit 56, thereby causing the SMA element of the first actuator unit 56 to contract, which moves the coupling mechanism of the first actuator unit 56 into grasping engagement with the rod 24 and moves the rod 24 along the longitudinal axis 26. Once the first actuator unit 56 is disposed in grasping engagement with the rod 24 and is moving the rod 24 along the longitudinal axis 26, the control signal to the fourth actuator unit 62 is interrupted, thereby causing the coupling mechanism of the fourth actuator unit 62 to disengage the rod 24 and return to the neutral position of the fourth actuator unit 62. It should be appreciated that the linear actuator assembly 22 may include any number of actuator units 28 required to allow each of the SMA elements to cool so that the coupling mechanism of each actuator unit 28 may return to the neutral position prior to being actuated again in the repeated cyclic order described above.

The actuator units 28 may be configured to default to a normally engaged position, in which the actuator units 28 are engaged in grasping engagement with the rod 24, or may be configured to default to a normally disengaged position, in which the actuator units 28 are not engaged in grasping engagement with the rod 24. If the actuator units 28 default to the normally engaged position, then activation of the SMA elements will release the actuator units 28 from engagement with the rod 24. In contrast, if the actuator units 28 default to the normally disengaged position, then activation of the SMA elements will cause the actuator units 28 to engage the rod 24.

Figure 2:
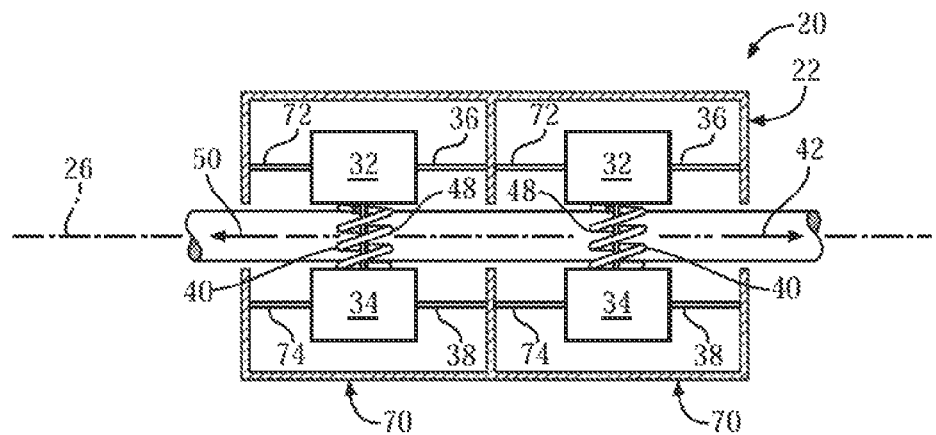
FIG. 2 is a schematic plan view of a first alternative embodiment of one of the plurality of actuator units.

Referring to FIG. 2, a first alternative embodiment of an actuator unit is generally shown at 70. The at least one SMA element of each of the plurality of actuator units 28 is configured to move the coupling mechanism and the rod 24 in both the first direction 42 and the second direction 50. In addition to the first SMA element 36 attached to the first coupling mechanism 32, and the second SMA element 38 attached to the second coupling mechanism 34, the at least one SMA element of the actuator unit 70 includes a third SMA element 72 attached to the first coupling mechanism 32, and a fourth SMA element 74 attached to the second coupling mechanism 34. The first SMA element 36 and the second SMA element 38 contract in response to the control signal to move the first coupling mechanism 32 and the second coupling mechanism 34 in the first direction 42. The third SMA element 72 and the fourth SMA element 74 contract in response to a control signal to move the first coupling mechanism 32 and the second coupling mechanism 34 in the second direction 50. By including the third SMA element 72 and the fourth SMA element 74, the actuator unit 70 eliminates the need for the first biasing device 44 and the second biasing device 46 described above.

Figure 3:
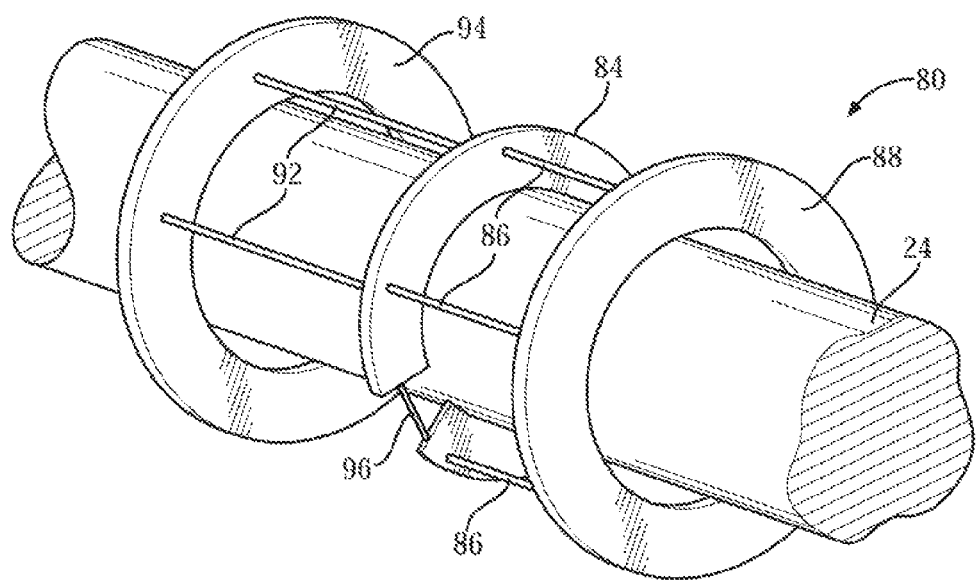
FIG. 3 is a schematic perspective view of a second alternative embodiment of one of the plurality of actuator units.

Referring to FIG. 3, a second alternative embodiment of one of the actuator units is generally shown at 80. The actuator unit 80 is configured to act on a rod 24 having a circular cross section perpendicular to the longitudinal axis 26 of the rod 24. The actuator unit 80 includes a coupling mechanism 84 having a generally C-shaped configuration disposed about an outer periphery of the rod 24. The C-shaped coupling mechanism 84 includes and/or is manufactured from a spring material that is biased to expand radially outward. The at least one SMA element includes a plurality of first SMA elements 86 connecting the C-shaped coupling mechanism 84 to a first end 88 of a housing 30, and a plurality of second SMA elements 92 connecting the C-shaped coupling mechanism 84 to a second end 94 of the housing 30. A connecting SMA element 96 connects the open ends of the C-shaped coupling mechanism 84.

In response to a control signal, the first SMA elements 86 and/or the second SMA elements 92 act to move the C-shaped coupling mechanism 84 in either the first direction 42 or the second direction 50 as described above. Additionally, in response to the control signal, the connecting SMA element 96 contracts to draw the open ends of the C-shaped coupling mechanism 84 together, bringing the coupling mechanism 84 into grasping engagement with the rod 24. Upon the cessation or interruption of the control signal and the resultant cooling and elongation of the connecting SMA element 96, the spring force of the C-shaped coupling mechanism 84 expands the coupling mechanism 84 radially outward to disengage the grasping engagement between the coupling mechanism 84 and the rod 24.

Figure 4:
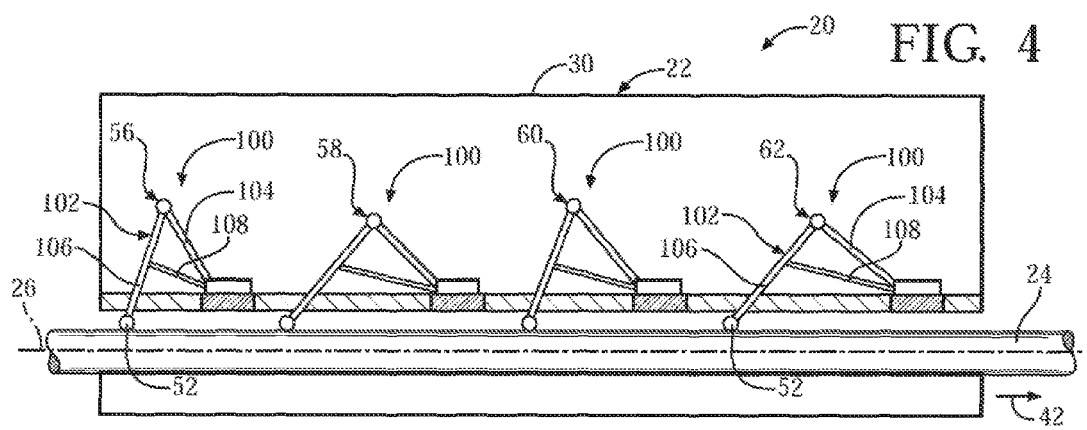
FIG. 4 is a schematic plan view of the linear motion device showing the linear actuator assembly with a third alternative embodiment of the plurality of actuator units.

Referring to FIG. 4, a third alternative embodiment of the plurality of actuator units is generally shown at 100. Each actuator unit 100 includes a lever arm 102 having a first member 104 attached to the housing 30, and a second member 106 cantilevered from the first member 104. An SMA element 108 is attached to and interconnects the second member 106 of the lever arm 102 and the housing 30. Contraction of the SMA element 108 moves a distal end of the second member 106 in the first direction 42 and into grasping engagement with the rod 24. Accordingly, the lever arm 102 of the actuator units 100 increase the strength applied to the rod 24, with a decrease in the movement speed of the rod 24.

The plurality of actuator units 28 may be defined by groups of actuator units 28 that work simultaneously with each other, with the groups of actuator units 28 following the repeated cyclic order described above. The linear actuator assembly 22 shown in FIG. 4 includes a first actuator unit 56, a second actuator unit 58, a third actuator unit 60 and a fourth actuator unit 62. The plurality of actuator units 28 may include a first group and a second group. For example, the first group may include the first actuator unit 56 and the third actuator unit 60, and the second group may include the second actuator unit 58 and the fourth actuator unit 62. Each of the actuator units 28 in the different groups of actuator units 28 may be actuated simultaneously to increase a moving force applied to the rod 24. For example, the first group may be actuated simultaneously to engage and move the rod 24, and prior to the first group moving the rod 24 the unit movement distance 54, the second group of actuator units 28 may be actuated to engage and move the rod 24. Accordingly, the use of multiple actuator units 28 simultaneously increases the overall force applied to move the rod 24. It should be appreciated that the number of actuator units 28 in each group, and the number of groups of actuator units 28 may differ from the exemplary embodiment described above.

Figure 5:
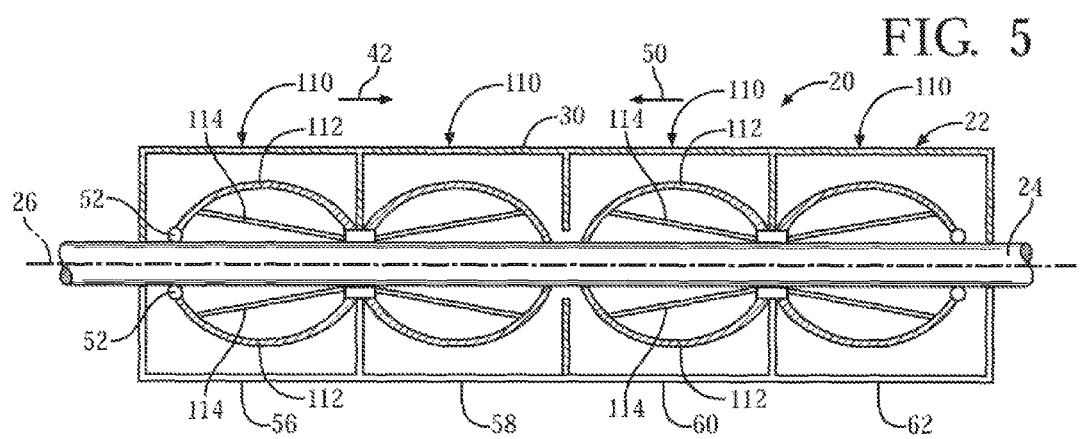
FIG. 5 is a schematic plan view of the linear motion device showing the linear actuator assembly with a fourth alternative embodiment of the plurality actuator units.
Figure 6:
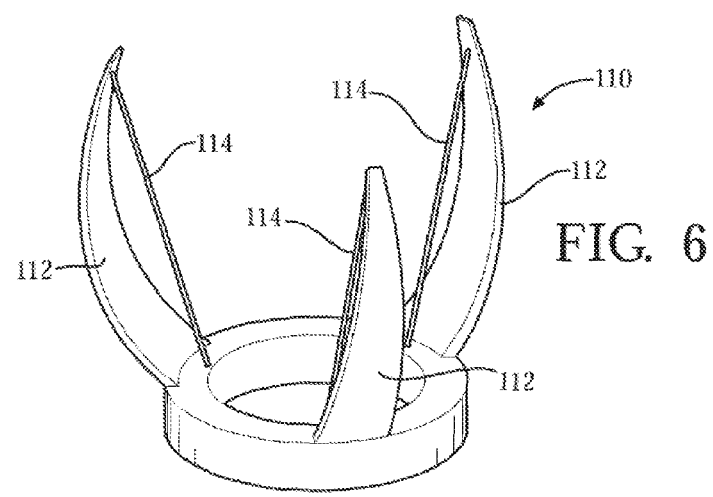
FIG. 6 is a schematic perspective view of the fourth alternative embodiment of one of the plurality of actuator units.

Referring to FIGS. 5 and 6, a fourth alternative embodiment of the plurality of actuator units is generally shown at 110. Each actuator unit 110 includes a plurality of spring arms 112 connected to the housing 30 by an SMA element 114. In response to the control signal, each of the SMA elements 114 contract, drawing a distal end of each respective spring arms 112 into grasping engagement with the rod 24 and moving the distal end of the spring arms 112 along the longitudinal axis 26. The plurality of actuator units 110 may include a first group and a second group, with the first group configured to move the rod 24 in the first direction 42, and the second group configured to move the rod 24 in the second direction 50. As shown in FIG. 5, the plurality of actuator units 110 includes a first actuator unit 56, a second actuator unit 58, a third actuator unit 60 and a fourth actuator unit 62. The first actuator unit 56 and the third actuator unit 60 define the first group for moving the rod 24 in the first direction 42, and the second actuator unit 58 and the fourth actuator unit 62 define the second group for moving the rod 24 in the second direction 50.

The SMA element(s) of the above described embodiments of the linear actuator assembly are manufactured from a Shape Memory Alloy. The shape memory alloy is one of many different active materials. Accordingly, it should be appreciated that the SMA may include some other active material, such as but not limited to shape memory polymers (SMP), piezoelectric materials, electroactive polymers (EAP), and ferromagnetic materials.

Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

As noted above, the control signal preferably includes an electrical signal for actuating the SMA element. However, it should be appreciated that if another active material is used, then the control signal may differ. For example, the control signal may alternatively include a heat signal, a magnetic signal, a pneumatic signal, a mechanical signal, and the like, and combinations comprising at least one of the foregoing signals, with the particular activation signal dependent on the materials and/or configuration of the active material.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A linear motion device comprising:
a rod extending along a longitudinal axis; and
a plurality of actuator units, with each of the plurality of actuator units including at least one Shape Memory Alloy (SMA) element attached to a coupler, wherein the at least one SMA element of each of the plurality of actuator units moves the coupler along the longitudinal axis and into grasping engagement with the rod to move the rod a unit movement distance along the longitudinal axis in response to a control signal;
wherein the plurality of actuator units are actuated repeatedly in a synchronous order to move the rod in a continuous linear motion a distance greater than the unit movement distance of each of the plurality of actuator units;
wherein each of the plurality of actuator units includes a first coupler and a second coupler disposed on opposite sides of the rod; and
wherein the at least one SMA element includes a connecting SMA element extending between and attached to both the first coupler and the second coupler and configured to contract to draw the first coupler and the second coupler together into grasping engagement with the rod in response to the signal.

2. A linear motion device as set forth in claim 1 wherein the at least one SMA element of each of the plurality of actuator units contracts in response to the control signal to move the coupler.

3. A linear motion device as set forth in claim 1 wherein the at least one SMA element of each of the plurality of actuator units elongates in response to the cessation of the control signal to release the coupler from the grasping engagement with the rod and allow the coupler to return to a neutral position.

4. A linear motion device as set forth in claim 1 wherein the at least one SMA element of each of the plurality of actuator units is operable to move the coupler and the rod in both a first direction parallel to the longitudinal axis, and a second direction parallel to the longitudinal axis, wherein the first direction is opposite the second direction.

5. A linear motion device as set forth in claim 4 wherein the at least one SMA element includes a first SMA element attached to the coupler for moving the coupler in the first direction, and a second SMA element attached to the coupler for moving the coupler in the second direction.

6. A linear motion device as set forth in claim 1 wherein each of the plurality of actuator units includes at least one spring.

7. A linear motion device as set forth in claim 1 wherein at least one of the rod and the coupler include a friction feature.

8. A linear motion device as set forth in claim 1 wherein each of the plurality of actuator units includes a housing, with the rod and the coupler moveable relative to the housing.

9. A linear motion device as set forth in claim 8 wherein the coupler is coupled to the housing.

10. A linear motion device as set forth in claim 1 wherein a first group of the plurality of actuator units may be actuated simultaneously to increase a moving force applied to the rod.

11. A linear motion device as set forth in claim 1 wherein the coupler includes a spring member.

12. A linear motion device as set forth in claim 1 wherein the coupler includes a lever arm.

13. A linear motion device as set forth in claim 1 wherein each of the plurality of actuator units may default to a normally engaged position disposed in grasping engagement with the rod, or a normally disengaged position not disposed in grasping engagement with the rod.

14. A linear actuator assembly for a linear motion device, the linear actuator assembly comprising:
   a plurality of actuator units, with each of the actuator units including:
      a housing;
      a coupler; and
      at least one Shape Memory Alloy (SMA) element attached to the coupler;
      wherein the at least one SMA element moves the coupler from a neutral position along a longitudinal axis and into grasping engagement with a rod to move the rod a unit movement distance along the longitudinal axis in response to a control signal;
      wherein the at least one SMA element of each of the plurality of actuator units contracts in response to the control signal to move the coupler; and
      wherein the at least one SMA element of each of the plurality of actuator units elongates in response to the cessation of the control signal to release the coupler from the grasping engagement with the rod and allow the coupler to return to the neutral position;
   wherein the plurality of actuator units are actuated repeatedly in a synchronous order to move the rod in a continuous linear motion a distance greater than the unit movement distance of each of the plurality of actuator units; and
   wherein each of the plurality of actuator units includes a first coupler and a second coupler disposed on opposite sides of the rod, and wherein the at least one SMA element includes a connecting SMA element extending between and attached to both the first coupler and the second coupler and configured to contract to draw the first coupler and the second coupler together into grasping engagement with the rod in response to the signal.

15. A linear actuator assembly as set forth in claim 14 wherein each of the plurality of actuator units includes at least one spring.

16. A linear actuator assembly as set forth in claim 14 wherein each of the plurality of actuator units includes a housing, with the rod and the coupler moveable relative to the housing, and with the coupler coupled to the housing.

17. A linear actuator assembly as set forth in claim 14 wherein the at least one SMA element includes a first SMA element attached to the coupler for moving the coupler in a first direction parallel to the longitudinal axis, and a second SMA element attached to the coupler for moving the coupler in a second direction parallel to the longitudinal axis, wherein the first direction is opposite the second direction.

* * * * *